United States Patent
Aggarwal et al.

(10) Patent No.: US 7,400,579 B2
(45) Date of Patent: Jul. 15, 2008

(54) METHOD AND APPARATUS FOR PER-CALL FILTERING OF H.323 PACKETS

(75) Inventors: Mitu Aggarwal, Portland, OR (US); Benjamin Metzler, Beaverton, OR (US); Hani Elgebaly, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 891 days.

(21) Appl. No.: 09/968,226

(22) Filed: Sep. 28, 2001

(65) Prior Publication Data

US 2003/0063599 A1    Apr. 3, 2003

(51) Int. Cl.
*H04L 12/26* (2006.01)

(52) U.S. Cl. .................... 370/230; 370/352; 370/395.3; 709/224

(58) Field of Classification Search ................. 370/352, 370/356, 395.31; 709/224
See application file for complete search history.

(56) References Cited

U.S. PATENT DOCUMENTS

| | | | |
|---|---|---|---|
| 6,122,665 A | | 9/2000 | Bar |
| 6,775,277 B1 * | | 8/2004 | Li et al. ........................ 370/389 |
| 6,795,534 B2 * | | 9/2004 | Noguchi .................. 379/88.17 |
| 6,816,455 B2 * | | 11/2004 | Goldberg et al. ............. 370/230 |
| 6,865,604 B2 * | | 3/2005 | Nisani et al. ................. 709/224 |
| 6,871,229 B2 * | | 3/2005 | Nisani et al. ................. 709/224 |
| 6,880,004 B2 * | | 4/2005 | Nisani et al. ................. 709/224 |
| 7,031,297 B1 * | | 4/2006 | Shabtay et al. .............. 370/352 |

* cited by examiner

*Primary Examiner*—Wing F. Chan
*Assistant Examiner*—Michael J Moore, Jr.
(74) *Attorney, Agent, or Firm*—Blakely, Sokoloff, Taylor & Zafman LLP

(57) ABSTRACT

A method and system for filtering data packets in a multiple-call environment are described. In one embodiment, each data packet received from a packet source is associated with an identifier of an IP telephone call that corresponds to this data packet. The IP telephone call is identified using information contained in the data packet. In one embodiment, all data packets related to a specific IP telephone call can be traced using the identifier of the specific IP telephone call.

27 Claims, 7 Drawing Sheets

| ID | CALL | TIME | SOURCE | DESTINATION | PROTOCOL | DESCRIPTION |
|---|---|---|---|---|---|---|
| 24 | 0 | 09:14:31.922106 | 143.182.16.15:2233 | 192.168.9.1:2233 | RAS | GATEKEEPERREQUEST |
| 25 | 0 | 09:14:46.898753 | 143.182.16.15:2233 | 192.168.9.1:2233 | RAS | GATEKEEPERREQUEST |
| 26 | 1 | 09:14:46.954296 | 192.168.122.168:2051 | 192.168.9.1:1719 | RAS | ADMISSIONREQUEST |
| 27 | 1 | 09:14:47.090643 | 192.168.9.1:1719 | 192.168.122.168:2051 | RAS | ADMISSIONCONFRIM |
| 28 | 1 | 09:14:47.284328 | 192.168.122.168:2664 | 192.168.9.1:1720 | Q931 | SETUP |
| 29 | 1 | 09:14:47.440028 | 192.168.122.168:2664 | 192.168.9.1:1720 | Q931 | PROCEEDING |
| 30 | 0 | 09:15:01.908674 | 143.182.16.15:2233 | 192.168.9.1:2233 | RAS | GATEKEEPERREQUEST |
| 31 | 1 | 09:15:02.884220 | 192.168.122.168:2664 | 192.168.9.1:1720 | Q931 | RELEASECOMPLETE |
| 32 | 1 | 09:15:02.914203 | 192.168.122.168:2051 | 192.168.9.1:1719 | RAS | DISENGAGEREQUEST |
| 33 | 1 | 09:15:03.102520 | 192.168.9.1:1719 | 192.168.122.168:2051 | RAS | DISENGAGECONFIRM |
| 34 | 2 | 09:15:03.298814 | 192.168.169.2052 | 192.168.9.1:1719 | RAS | ADMISSIONREQUEST-ERROR |
| 35 | 2 | 09:15:03.413504 | 192.168.9.1:1719 | 192.168.169.2052 | RAS | ADMISSIONCONFIRM |
| 36 | 2 | 09:15:03.628934 | 192.168.122.169:2916 | 192.168.9.1:1720 | Q931 | SETUP |
| 37 | 2 | 09:15:03.763567 | 192.168.9.1:1720 | 192.168.122.169:2916 | Q931 | PROCEEDING |
| 38 | 2 | 09:15:15.688868 | 192.168.122.169:2916 | 192.168.9.1:1720 | Q931 | RELEASE COMPLETE |
| 39 | 2 | 09:15:16.728778 | 192.168.122.169:2052 | 192.168.9.1:1719 | RAS | DISENGAGEREQUEST |
| 40 | 2 | 09:15:16.902257 | 192.168.9.1:1719 | 192.168.122.169:2052 | RAS | DISENGAGECONFIRM |
| 41 | 0 | 09:15:16.979152 | 143.182.16.15:2233 | 192.168.9.1:2233 | RAS | GATEKEEPERREQUEST |
| 42 | 3 | 09:15:27.304527 | 192.168.122.168:2051 | 192.168.9.1:1719 | RAS | ADMISSIONREQUEST |
| 43 | 0 | 09:15:27.369738 | 192.168.9.1:1719 | 192.168.122.168:2051 | RAS | ADMISSIONCONFIRM |

FIG. 7

METHOD AND APPARATUS FOR PER-CALL FILTERING OF H.323 PACKETS

FIELD OF THE INVENTION

The present invention relates to the field of Internet Protocol (IP) telephony; more particularly, the present invention relates to the filtering of IP data packets in a multiple-call environment.

BACKGROUND

IP telephony allows people to use the Internet as the transmission medium for telephone calls. The basic steps involved in originating an IP telephone call are conversion of the analog voice signal to digital format, and compression/translation of the signal into IP data packets for transmission over the Internet, with the process being reversed at the receiving end. Each IP data packet may be transmitted between two endpoints directly or via one or more IP telephony gateways. Accordingly, an IP telephony gateway may host multiple IP telephone calls.

Network monitors and network sniffing tools are designed to capture IP packets from the network. For example, these tools may be used to capture packets between two H.323 entities. An H.323 entity is an entity that follows an H.323 protocol, which is defined by Telecom Standard H.323 of the International Telecommunication Union (ITU-T). H.323 describes terminals, equipment and services for multimedia communication over networks. Computer terminals and equipment that fulfill H.323 may carry real-time voice, data and video, or any combination including, for example, video telephony.

Some network monitors and network sniffing tools may include parsers for filtering IP data packets such as H.323 Protocol Data Units (PDUs) and may be used to assist software engineers in debugging IP telephony applications. This assistance, however, has proven to be insufficient in a multiple-call environment.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 7 illustrates an exemplary user interface presenting data packet information to a user.

DETAILED DESCRIPTION

Figure 1:
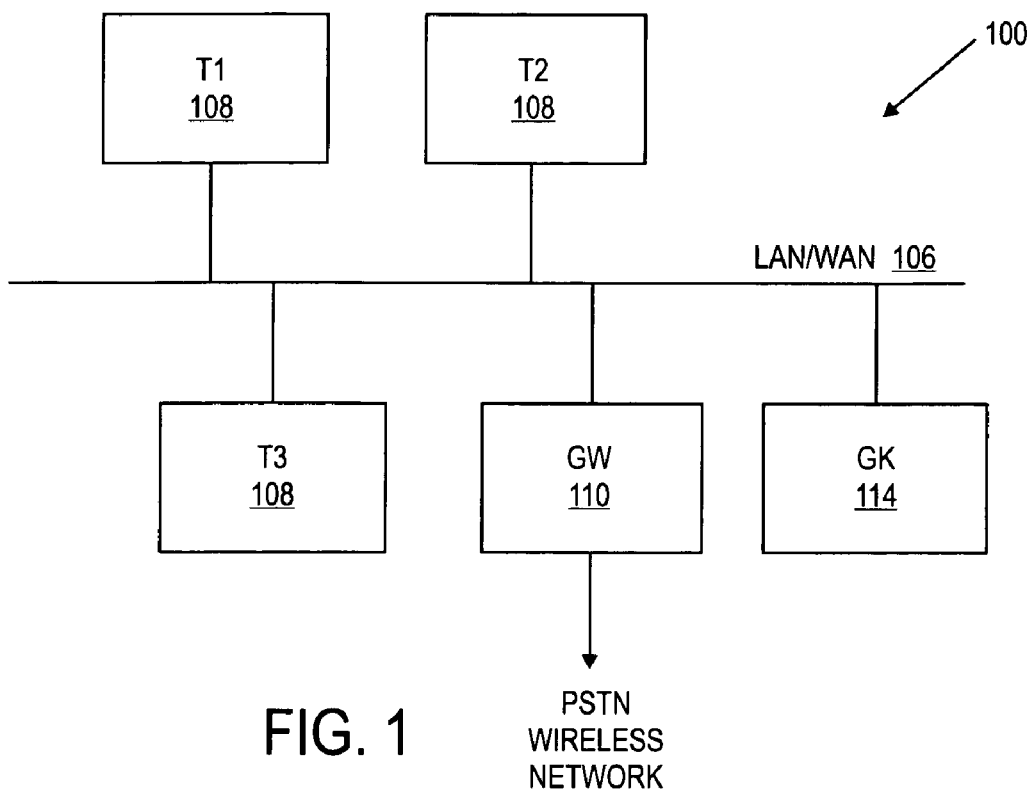
FIG. 1 is a block diagram of one embodiment of an IP telephony network configuration.

A method and apparatus for filtering data packets in a multiple-call environment are described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language or protocol. It will be appreciated that a variety of programming languages may be used to implement the teachings of the invention as described herein. Furthermore, H.323 protocols and/or other protocols may be used with the present invention.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

FIG. 1 is a block diagram of one embodiment of an IP telephony network configuration. Referring to FIG. 1, a plurality of terminals 108, designated as "T1", "T2" and so forth, are coupled to a network 106, such as a local are network (LAN) or wide area network (WAN). Terminals 108 follow an H.323 type protocol. Each terminal 108 is an endpoint on network 106, which provides for real-time, two-way communications with another terminal 108 or a gateway 110. This communication consists of control, indications, audio streams, video streams, and/or data. Terminal 108 is optionally only capable of providing such communication for audio only, audio and data, audio and video, or audio, data and video. Terminal 108 may be a personal computer (PC), a lap-top computer, a personal digital assistant (PDA) or any other computer able to communicate on an IP-based network.

Gateway 110 (GW) is constructed according to H.323 and is an endpoint on network 106 that provides for real-time, two-way communications between terminals 108 on network 106 and other suitable terminals (not shown), or to another such Gateway (not shown). Other suitable terminals may include conventional telephone handsets connected to gateway 110 via a public switched telephone network (PSTN), mobile phones connected to gateway 110 via a wireless network, etc.

System 100 may also optionally include a gatekeeper (GK) 114. Gatekeeper 114 is an H.323 entity on network 106 that provides address translation and controls access to network 106 for terminals 108 and gateways 110. Gatekeeper 114 may also provide other services to terminals 108 and gateways 110 such as bandwidth management and locating gateways 110. Gatekeeper 114 may also enable the IP address of terminals 108 on network 106 to be determined "on the fly".

Communications between entities on network 106 are in the form of H.323 Protocol Data Unit (PDU) messages. Depending on its function, an H.323 PDU message may conform to a particular protocol defined by the H.323 standard, including an H.225 protocol, an H.245 protocol, an H.450.X protocol, etc. For example, the logical channel signaling of H.245 describes the content of each logical channel when the channel is opened. Procedures are provided for the communication of the functional capabilities of receivers and transmitters, so that transmissions are limited to information, which can be decoded by the receivers, and so that receivers may request a particular desired mode from transmitters. H.245 signaling is established between two endpoints (e.g., between two terminals 108 or between terminal 108 and gateway 110), or an endpoint and a Gatekeeper. The endpoint establishes exactly one H.245 Control Channel for each call that the endpoint is participating in. The channel must then operate according to H.245. Support for multiple calls and hence for multiple H.245 Control Channels is provided.

The signaling function of the routing and administration service (RAS) uses H.225.0 messages to perform registration, admissions, bandwidth changes, status, and disengage procedures between endpoints and Gatekeepers. In network environments that do not have a Gatekeeper, the RAS Signaling Channel is not used. In network environments that contain a Gatekeeper, the RAS Signaling Channel is opened between an endpoint or gateway and the Gatekeeper. The RAS Signaling Channel is opened prior to the establishment of any other channels between H.323 endpoints.

The call signaling function uses H.225.0 call signaling to establish a connection between two H.323 endpoints. The Call Signaling Channel is independent from the RAS Channel and the H.245 Control Channel. The Call Signaling Channel is opened prior to the establishment of the H.245 Channel and any other logical channels between H.323 endpoints. In systems that do not have a Gatekeeper, the Call Signaling Channel is opened between the two endpoints involved in the call. In systems that contain a Gatekeeper, the Call Signaling Channel is opened between the end point and the Gatekeeper, or between the endpoints themselves as chosen by the Gatekeeper.

Any entity shown in FIG. 1 including terminals 108, gateways 110 or gatekeeper 114 may include a network monitor that captures H.323 PDU messages that are sent to, or received by, this entity. Alternatively, the network monitor may reside on a separate device coupled to network 106 to sniff H.323 PDU messages off network 106.

Figure 2:
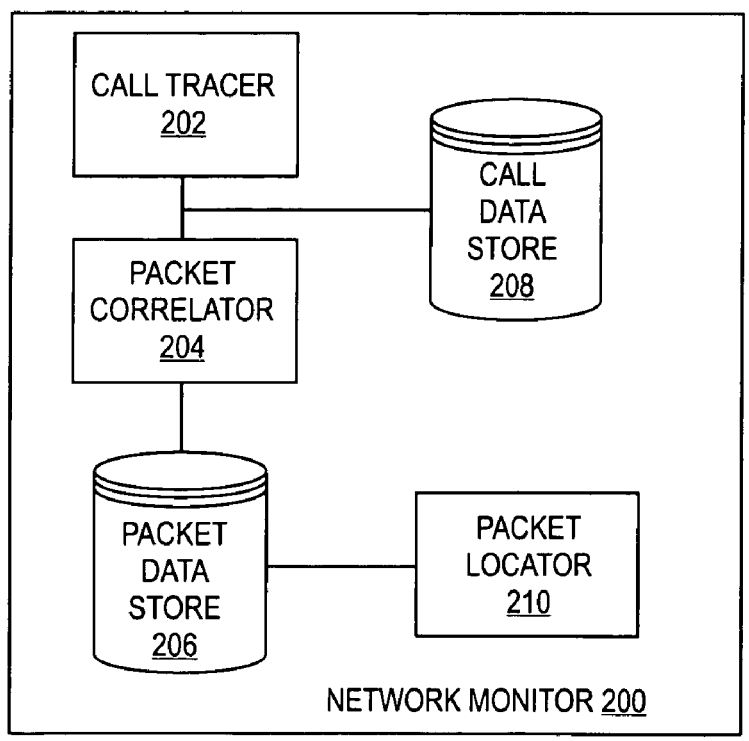
FIG. 2 is a block diagram of one embodiment of a network monitor.

FIG. 2 is a block diagram of one embodiment of a network monitor 200. Network monitor 200 is used in a multiple call environment. For example, network monitor 200 may be implemented on gateway 100 that provides service to numerous terminals 100.

In one embodiment, network monitor 200 includes a call tracer 202 and a packet correlator 204. Call tracer 202 is responsible for identifying Internet protocol (IP) telephone calls pertaining to data packets captured by network monitor 200. An IP telephone call is identified using one or more parameters included in a corresponding data packet. In one embodiment, call tracer 202 first determines the type of the packet and then based on some parameters in the packet, decides which specific IP telephone call the packet pertains to.

In one embodiment, network monitor 200 includes a call data store 208 that stores a list of parameters along with identifiers that identify specific IP telephone calls (referred to as "call IDs"). When call tracer 202 obtains the required parameters) from the data packet, call tracer 202 searches data store 208 to find a call ID corresponding to this parameter. If the parameter is not present, it is added to data store 208 with a new call ID assigned to this parameter.

Packet correlator 204 is responsible for associating the packet with the call ID. In one embodiment, the association is provided by storing the packet with the call ID in a packet data store 206. Data store 206 stores the data packets captured by network monitor 200 with their call IDs, thereby enabling the filtering of data packets on a per-call basis. In one embodiment, data store 208 and data store 206 are two separate data stores. Alternatively, data store 208 and data store 206 are combined into a single database.

In one embodiment, network monitor 210 also includes a packet locator 210 that locates a group of packets related to a specific IP telephone call in data store 206 and provides this information to a requester. The requester may be a software engineer who needs this information during the debugging of an IP telephony application in a multiple call environment. In addition, this information may be requested in the case of an H.323 interoperability event to track interoperability problems with multiple H.323 solution vendors attempting to make calls through a gateway. Being able to track packets related to a specific call is useful in this scenario in order to debug interoperability issues.

Figure 3:
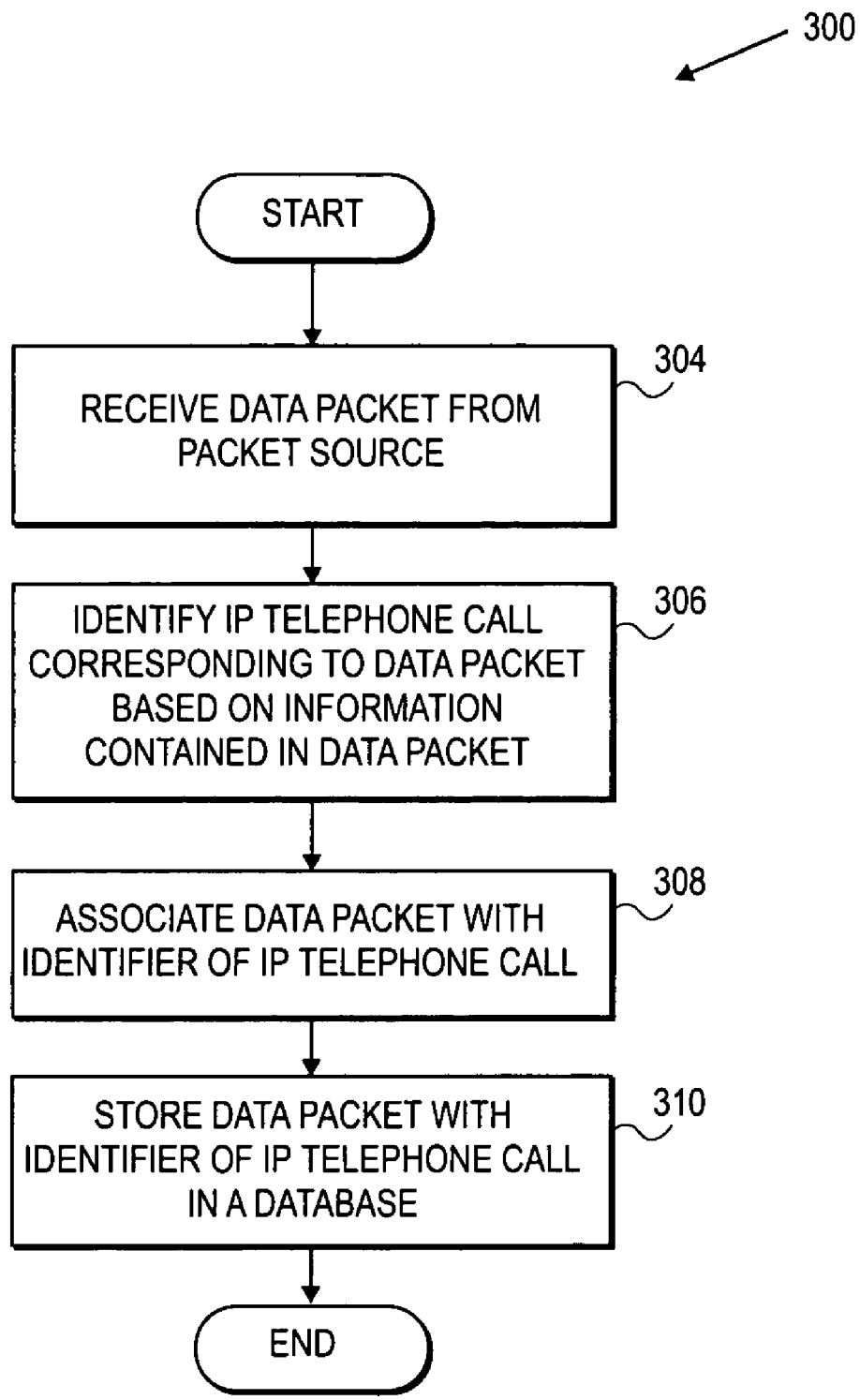
FIG. 3 is a flow diagram of one embodiment of a process for filtering data packets in a multiple-call environment.

FIG. 3 is a flow diagram of one embodiment of a process for filtering data packets in a multiple-call environment. The process may be performed by processing logic that may comprise hardware (e.g., circuitry, dedicated logic, etc.), software (such as run on a general purpose computer system or a dedicated machine), or a combination of both.

Referring to FIG. 3, process 300 begins with processing logic receiving a data packet from a packet source (processing block 304). A packet source may be, for example, a client device, a gateway, or a gatekeeper. In one embodiment, the data packet is an H.323 PDU message transmitted according to the Transmission Control Protocol used in connection with the Internet Protocol (TCP/IP). In this embodiment, the data packet may be either an H.225 call signaling message or an H.245 media signaling message. In an alternative embodiment, the data packet is an H.323 PDU message transmitted according to the User Datagram Protocol (UDP). In this embodiment, channel signaling function is performed by RAS which uses H.225 messages rather than H.245 messages to establish channels between two endpoints. Accordingly, in this embodiment, the data packet received is an H.225 message.

At processing block 306, processing logic identifies an IP telephone call corresponding to the data packet using information contained in the packet. In one embodiment, the data packet is an H.225 message that includes an indicator of the related IP telephone call as will be described in more detail below in conjunction with FIG. 4. In this embodiment, the call indicator (known as a "call-identifier") is used to identify the IP telephone call related to this data packet. In another embodiment, the data packet is an H.245 message that does not have a call-identifier call indicator field. In this embodiment, address information is used to identify the IP telephone call related to this data packet as will be described in greater detail below in conjunction with FIG. 5.

Further, processing logic finds an identifier of the related IP telephone call (call ID). In one embodiment, the call ID is found by searching a call data store using the call indicator. Alternatively, the ID is found by searching the call data store using the address information.

Afterwards, the data packet is associated with the call ID (processing block 308) and the data packet, together with the call ID, is stored in a database (processing block 310). This database serves as a repository of data packets tagged with specific call IDs. When information identifying a group of data packets related to a known call is needed, the database can be used to locate this group of data packets using the ID of the known call. For example, the database may be used to locate all the packets that relate to the same phone call as a specific data packet.

Figure 4:
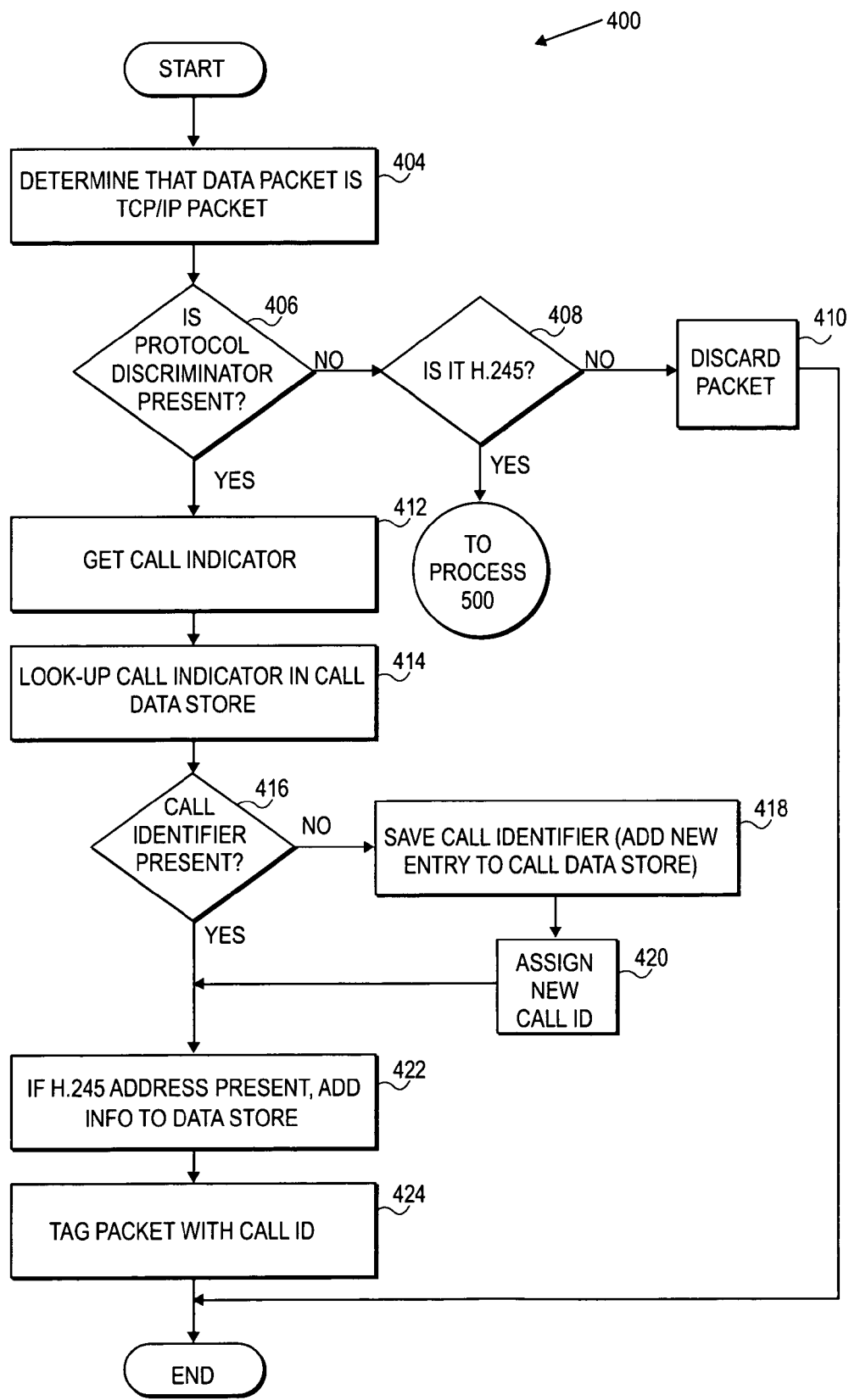
FIG. 4 is a flow diagram of one embodiment of a process for identifying an IP telephone call pertaining to an H.323 PDU that conforms to the TCP/IP protocol.

FIG. 4 is a flow diagram of one embodiment of a process 400 for identifying an IP telephone call pertaining to an H.323 PDU conforming to the TCP/IP protocol. The process may be performed by processing logic that may comprise hardware (e.g., circuitry, dedicated logic, etc.), software (such as run on a general purpose computer system or a dedicated machine), or a combination of both.

Referring to FIG. 4, process 400 begins with processing logic verifying that the data packet is a TCP/IP data packet (processing block 404) by examining the header of the packet. At decision box 406, a determination is made as to whether the TCP/IP packet is an H.225 message or an H.245 message. The determination is based on the header's protocol discriminator field which distinguishes messages for call control (i.e., H.225 messages) from other messages. If the packet is not an H.225 message, then a further determination is made as to whether the packet is an H.245 message using the header's information (decision box 408). If the determination is positive, process 500 will be performed. Process 500 is described in greater detail below in conjunction with FIG. 5.

Alternatively, if the data packet is neither an H.225 message nor an H.245 message, the data packet is discarded (processing block 410).

If the determination made at decision box 406 is positive, then the data packet is an H.225 message. As described above, an H.225 message is used to establish a connection between two endpoints or between an endpoint and a gatekeeper. The call signaling channel is opened prior to the establishment of the H.245 channel. The H.245 channel cannot be established unless a preceding H.225 message includes information identifying a specific transport address on which H.245 signaling can be established by the calling endpoint or gatekeeper. This address information is stored in an H.245 message in a designated field referred to as an H.245 Address filed. An H.225 message also includes a field storing an indicator of an IP telephone call related to the H.225 message, unlike an H.245 message that does not have this field. The call indicator (known as a "call-identifier") is a globally unique identifier that is assigned by the caller and sent out in the first H.225 message sent by the caller. All subsequent H.225 messages sent by either the caller or callee include the same call indicator as the first H.225 message.

Still referring to FIG. 4, at processing block 412, the H.225 message is examined to identify an indicator of an IP telephone call pertaining to the message. At processing block 414, a call data store is searched for this call indicator. In one embodiment, the call data store includes a list of call indicators extracted from previously examined data packets and stored with call IDs assigned to each record.

Next, at decision box 416, a determination is made as to whether the call indicator extracted from the H.225 message being processed is present in the call data store. If the determination is positive, processing block 422 is performed. If the determination is negative, the call indicator is saved in the call data store as a new entry (processing block 418) and a new call ID is assigned to the record (processing block 420) and stored with the call indicator.

Further, at processing block 422, the data packet is further examined to find an H.245 Address field. If this field contains address information for establishing a subsequent H.245 channel, this address information is also stored in the data store with the call ID. Afterwards, at processing block 424, the data packet is tagged with the call ID and stored in a database.

Figure 5:
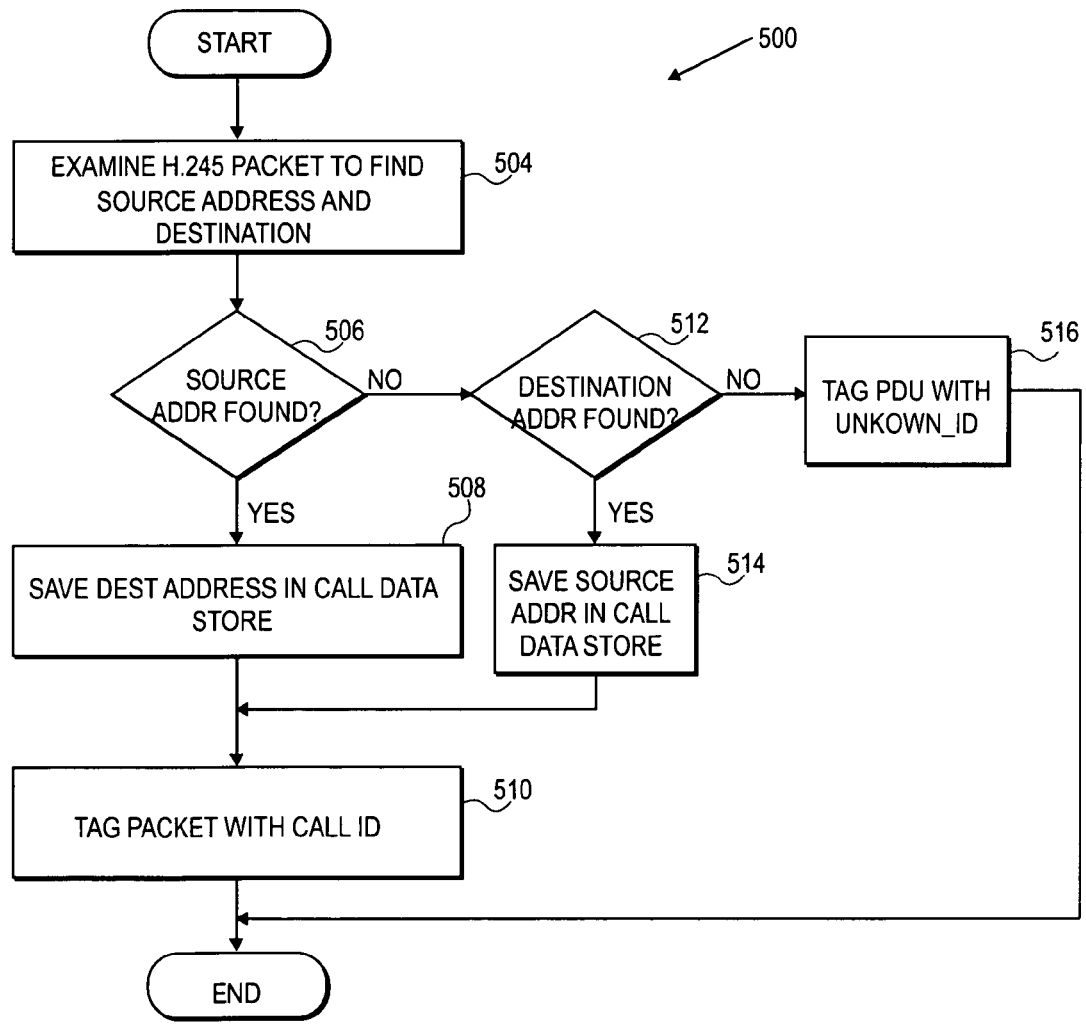
FIG. 5 is a flow diagram of one embodiment of a process for identifying an IP telephone call pertaining to an H.245 message.

FIG. 5 is a flow diagram of one embodiment of a process 500 for identifying an IP telephone call pertaining to an H.245 message. The process may be performed by processing logic that may comprise hardware (e.g., circuitry, dedicated logic, etc.), software (such as run on a general purpose computer system or a dedicated machine), or a combination of both.

As described above, an H.245 message does not include a call indicator field. To identify an IP telephone call pertaining to an H.245 message, process 500 uses source and destination IP address information included in the H.245 message. All H.245 messages related to the same IP telephone call will have matching source and destination IP address information (i.e., the source IP address and port of one H.245 message will match either source IP address and port or destination IP address and port of each other H.245 message relating to the same IP telephone call).

Referring to FIG. 5, process 500 begins with processing logic examining the H.245 message and extracting source and destination IP address information included in this message (processing block 504). Next, a call data store is searched for the source IP address information. In one embodiment, the call data store includes a source address column and a destination address column. The information in these columns may contain the address and port extracted from a prior H.245 message or the address and port extracted from the H.245 Address field of a prior H.225 message. The information in both of these columns is compared with the source address of the H.245 packet being processed. At decision box 506, a determination is made as to whether the source address information is found in the call data store. If this determination is positive, the destination address information extracted from the H.245 message being processed is stored in the entry having the matching source address (processing block 508). The H.245 packet is then tagged with the call ID from the entry having the matching address (processing block 510).

Alternatively, if the determination made at decision box 506 is negative, the call data store is searched for the destination address extracted from the data packet being processed. If the destination address matches any address information stored in the call data store, the source address information from this H.245 message is stored in the entry having the matching destination address (processing block 514). The H.245 message is then tagged with the call ID retrieved from the entry having the matching address.

If neither source address nor destination address is found in the call ID table (e.g., a prior H.225 message has not been captured), then the H.245 message is tagged with an ID designated to identify unknown IP telephone calls.

Figure 6:
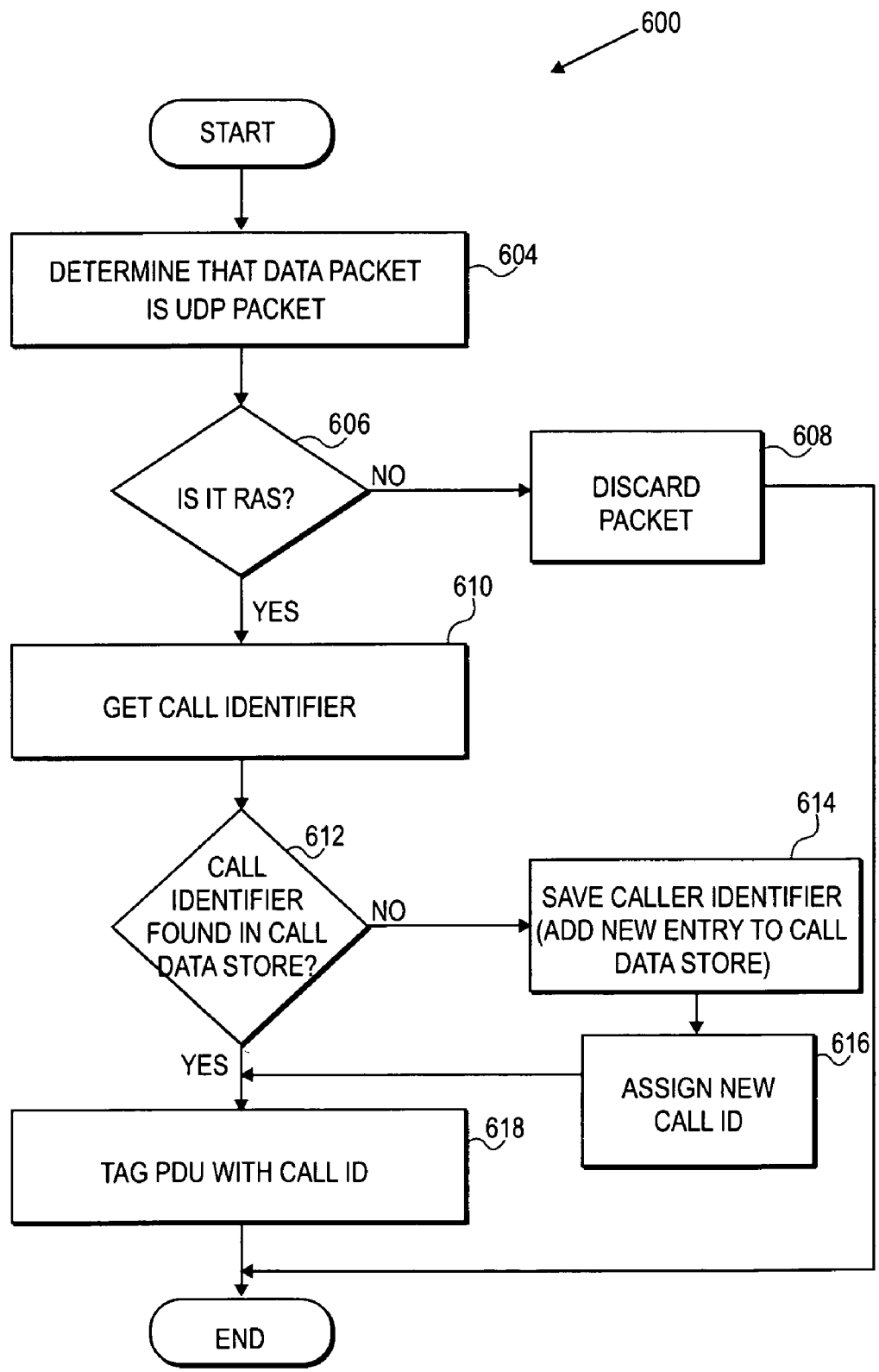
FIG. 6 is a flow diagram of one embodiment of a process for identifying an IP telephone call pertaining to an H.323 PDU that conforms to the UDP protocol.

FIG. 6 is a flow diagram of one embodiment of a process 600 for identifying an IP telephone call pertaining to an H.323 PDU conforming to the UDP protocol. The process may be performed by processing logic that may comprise hardware (e.g., circuitry, dedicated logic, etc.), software (such as run on a general purpose computer system or a dedicated machine), or a combination of both.

The UDP protocol requires the use of the RAS signaling function. As described above, the RAS signaling function uses H.225 messages rather than H.245 messages to open and establish channels between the endpoint and the gatekeeper or between the two endpoints. Accordingly, an H.323 PDU message conforming to the UDP can only be an H.225 message.

Referring to FIG. 6, process 600 begins with processing logic verifying that the data packet is a UDP data packet (processing block 604) by examining the header of the packet. At decision box 606, a determination is made as to whether the UDP packet is used for the RAS signaling function. If the determination is negative, the data packet is discarded (processing block 608).

If the determination made at decision box 606 is positive, then the data packet is an H.225 message that includes a call indicator that identifies an IP telephone call pertaining to this data packet. At processing block 610, the call indicator is extracted from the H.225 message and the call data store is searched for this call indicator.

Next, at decision box 612, a determination is made as to whether the call indicator extracted from the H.225 message is present in the call data store. If the determination is positive, processing block 618 is performed. If the determination is negative, the call indicator is saved in the call store as a new entry (processing block 614) and a new call ID is assigned to the record (processing block 616). Afterwards, at processing block 618, the data packet is tagged with the call ID.

FIG. 7 illustrates an exemplary user interface 700 presenting data packet information to a user. Referring to FIG. 7, user interface 700 displays a table 720 with a set of columns. Column 702 displays a unique ID assigned to each entry. Column 704 displays a call ID associated with each data packet residing in table 720. Column 706 displays the time when each packet was created. Column 708 displays the source IP address and port of each packet. Column 710 displays the destination IP address and port of each packet. Column 712 specifies a signaling protocol used by each packet. Finally, column 714 provides a description of each packet that indicates the functionality of the packet.

Figure 8:
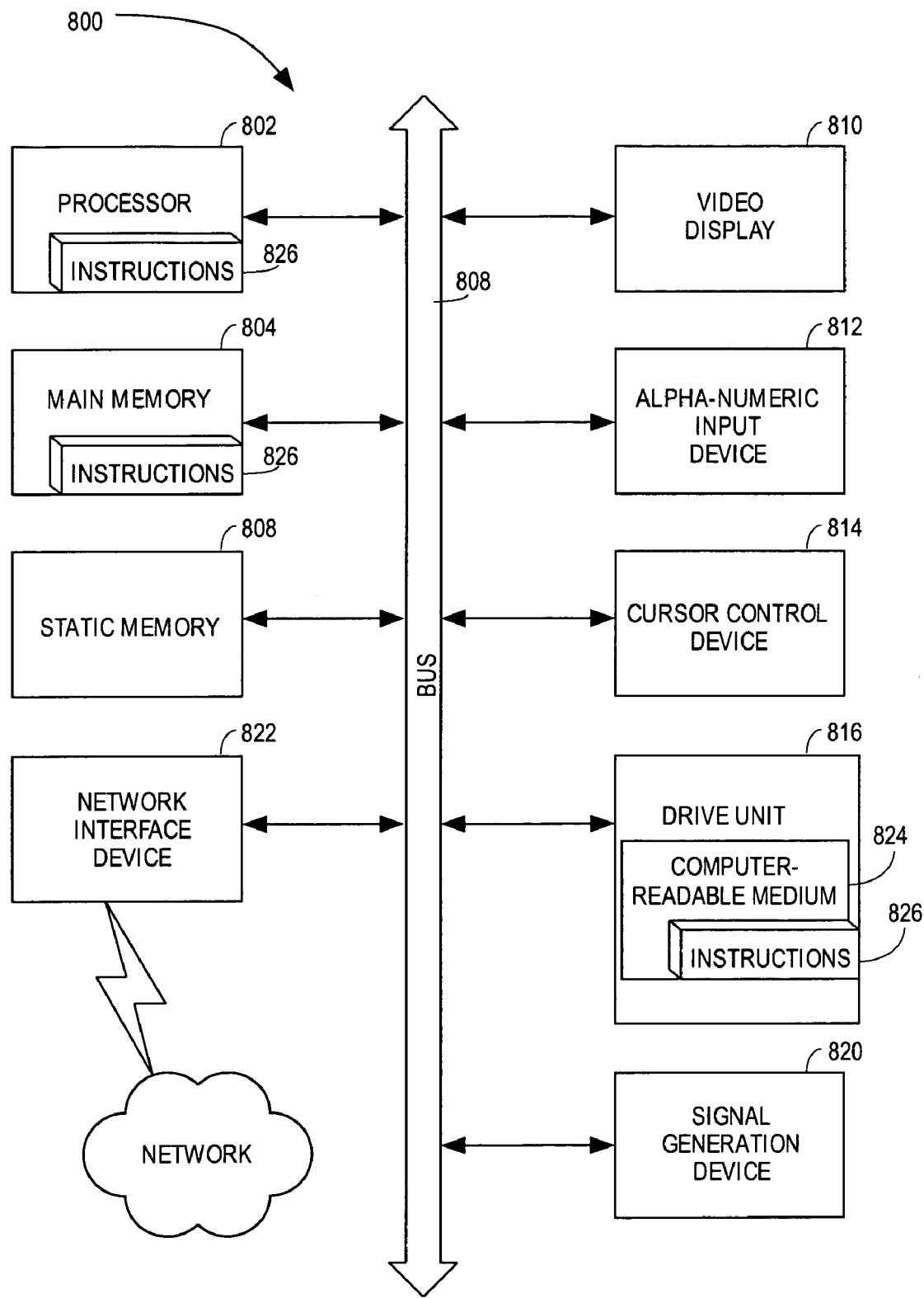
FIG. 8 is a block diagram of an exemplary computer system.

FIG. 8 is a block diagram of an exemplary computer system 800 that may be used to perform one or more of the operations described herein. In alternative embodiments, the machine may comprise a network server, a network gateway, a network router, a network switch, a network bridge, Personal Digital Assistant (PDA), a cellular telephone, a web appliance or any machine capable of executing a sequence of instructions that specify actions to be taken by that machine.

The computer system 800 includes a processor 802, a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alpha-numeric input device 812 (e.g., a keyboard), a cursor control device 814 (e.g., a mouse), a disk drive unit 816, a signal generation device 820 (e.g., a speaker) and a network interface device 822.

The disk drive unit 816 includes a computer-readable medium 824 on which is stored a set of instructions (i.e., software) 826 embodying any one, or all, of the methodologies described above. The software 826 is also shown to reside, completely or at least partially, within the main memory 804 and/or within the processor 802. The software 826 may further be transmitted or received via the network interface device 822. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories and optical and magnetic disks.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A computer-implemented method comprising:
   receiving a plurality of data packets from a packet source in a multiple-call environment;
   searching a database for an Internet protocol (IP) telephone call corresponding to each of the plurality of data packets using one or more data packet parameters contained in each data packet, the one or more data packet parameters comprising at least one of a call indicator assigned by a caller, a source IP address of the data packet, and a destination IP address of the data packet;
   if the one or more data packet parameters are not found in the database, creating an identifier of the IP telephone call;
   associating each data packet with the identifier of the IP telephone call; and storing the one or more data packet parameters with the identifier of the IP telephone call in the database for each data packet.

2. The method defined in claim 1 further comprising:
receiving a request to identify each of a plurality of data packets related to a specific IP telephone call; and
searching the database for said each of the plurality of data packets using an identifier of the specific IP telephone call.

3. The method defined in claim 1 wherein the packet source is any one of an endpoint, a gateway, and a gatekeeper.

4. The method defined in claim 1 wherein identifying the IP telephone call further comprises:
determining that the data packet is a TCP/IP packet;
determining that the data packet is in accordance with a standard protocol for control signaling in an H.323 environment; and
extracting an indicator of the IP telephone call from the data packet.

5. The method defined in claim 4 further comprising:
determining whether the indicator of the IP telephone call is present in a call data store;
if the indicator of the IP telephone call is present in the call data store, retrieving a corresponding identifier of the IP telephone call from the call data store; and
if the indicator of the IP telephone call is not present in the call data store, assigning an identifier to the IP telephone call and adding a new entry with the identifier of the IP telephone call to the call data store.

6. The method defined in claim 5 further comprising:
determining that the data packet includes address information of a subsequent data packet that is in accordance with a standard protocol for control messages in an H.323 environment; and
storing the address information of the subsequent data packet in a call data store entry associated with the IP telephone call.

7. The method defined in claim 1 wherein identifying the IP telephone call further comprises:
determining that the data packet is a TCP/IP packet;
determining that the data packet is in accordance with a standard protocol for control messages in an H.323 environment;
extracting source address information and destination address information from the data packet; and
searching a call data store for the source address information.

8. The method defined in claim 7 further comprising:
if the source address information is found in the call data store, retrieving the identifier of the IP telephone call from a call data store entry including the source address information, and storing the destination address information in the call data store entry.

9. The method defined in claim 7 further comprising:
if the source address information is not found in the call data store, searching the call data store for the destination address information.

10. The method defined in claim 9 further comprising:
if the destination address information is found in the call data store, retrieving the identifier of the IP telephone call from a call data store entry including the destination address information and storing the source address information in the call data store entry; and
if the destination address information is not found in the call table, associating the data packet with an identifier designated for unknown IP telephone calls.

11. The method defined in claim 1 wherein identifying the IP telephone call further comprises:
determining that the data packet is a UDP packet;
determining that the data packet is a routing and administration service (RAS) packet; and
extracting an indicator of the IP telephone call from the data packet.

12. The method defined in claim 11 further comprising:
determining whether the indicator of the IP telephone call is present in a call data store;
if the indicator of the IP telephone call is present in the call data store, retrieving a corresponding identifier of the IP telephone call from the call data store; and
if the indicator of the IP telephone call is not present in the call data store, assigning an identifier to the IP telephone call and adding a new entry including the identifier of the IP telephone call to the call data store.

13. The method defined in claim 11 further comprising:
determining that the data packet is not a RAS packet; and
discarding the data packet.

14. The method defined in claim 1 further comprising:
determining that the data packet is neither one of a TCP/IP packet and a UDP packet; and
discarding the data packet.

15. A computer apparatus comprising:
a call tracer to receive a plurality of data packets from a packet source in a multiple-call environment and to identify an Internet protocol (IP) telephone call corresponding to each data packet using one or more data packet parameters contained in each data packet, the one or more data packet parameters comprising at least one of a call indicator assigned by a caller, a source IP address of the data packet, and a destination IP address of the data packet;
a call data store to store IP telephone calls with corresponding data packet parameters of each data packet;
a packet locator to receive a request to identify each data packet and search the call data store for the identified IP telephone call;
a packet correlator to create an identifier of the IP telephone call and associate the data packet with the identifier if the data packet is not found in the call data store.

16. The apparatus defined in claim 15 wherein the packet locator receives a request to identify each of a plurality of data packets related to a specific IP telephone call, and searches the database for said each of the plurality of data packets using an identifier of the specific IP telephone call.

17. The apparatus defined in claim 15 wherein the packet source is any one of an endpoint, a gateway, and a gatekeeper.

18. The apparatus defined in claim 15 wherein the call tracer is to identify the IP telephone call by determining that the data packet is a TCP/IP packet, determining that the data packet is in accordance with a standard protocol for control signaling in an H.323 environment, extracting an indicator of the IP telephone call from the data packet, and searching a call data store to determine the identifier of the IP telephone based on the indicator of the IP telephone call.

19. The apparatus defined in claim 15 wherein the call tracer is to identify the IP telephone call by determining that the data packet is a TCP/IP packet, determining that the data packet is in accordance with a standard protocol for control messages in an H.323 environment, extracting source address information and destination address information from the data packet, searching a call data store for the source address information, and retrieving the identifier of the IP telephone call from a call data store entry including the source address information if the source address information is present in the call data store.

20. The apparatus defined in claim 19 wherein the call tracer is to determine that the source address information is not present in the call data store, to search the call data store for the destination address information, and to retrieve the identifier of the IP telephone call from a call data store entry including the destination address information.

21. The apparatus defined in claim 15 wherein the call tracer is to identify the IP telephone call by determining that the data packet is a UDP packet, that the data packet is a routing and administration service (RAS) packet, extracting an indicator of the IP telephone call from the data packet, and searching a call data store for an identifier of the IP telephone using the indicator of the IP telephone call.

22. The apparatus defined in claim 21 wherein the call tracer is to determine that the data packet is not a RAS packet, and to discard the data packet.

23. A computer-readable storage medium having executable instructions stored thereon which, when executed by a processing device, cause the processing device to:
  receiving a plurality data packets from a packet source in a multiple-call environment;
  searching a database for an Internet protocol (IP) telephone call corresponding to each data packet using one or more data packet parameters contained in the data packet, the one or more data packet parameters comprising at least one of a call indicator assigned by a caller, a source IP address of the data packet, and a destination IP address of the data packet;
  if the one or more data packet parameters are not found in the database, creating an identifier of the IP telephone call;
  associating each data packet with the identifier of the IP telephone call; and
  storing the one or more data packet parameters with the identifier of the IP telephone call in the database for each data packet.

24. The computer-readable storage medium defined in claim 23 wherein executable instructions further cause the processing device to:
  receive a request to identify each of a plurality of data packets related to a specific IP telephone call; and
  search the database for said each of the plurality of data packets using an identifier of the specific IP telephone call.

25. The computer-readable storage medium defined in claim 23 wherein the packet source is any one of an endpoint, a gateway, and a gatekeeper.

26. A computer-implemented method comprising:
  receiving a plurality of data packets from at least one packet source in a multiple-call environment;
  identifying an internet protocol (IP) telephone call corresponding to each of the plurality of data packets based on one or more data packet parameters contained in the plurality of data packets, the one or more data packet parameters comprising at least one of a call indicator assigned by a caller, a source IP address of the data packet, and a destination IP address of the data packet;
  determining whether the IP telephone call corresponds to any previously received data packets;
  for each of the plurality of data packets,
    assigning an identifier associated with a previously received data packet to a current data packet if the previously received data packet corresponds to the IP telephone call,
    assigning a new identifier to the current data packet based on the IP telephone call if none of the previously received data packets correspond to the IP telephone call; and
  storing the current data packet with the identifier in a database.

27. The method of claim 26, wherein:
  the plurality of data packets comprises data packets corresponding to IP telephone calls that pass through a network monitor.

* * * * *